US007654619B2

(12) United States Patent
Knechtges et al.

(10) Patent No.: US 7,654,619 B2
(45) Date of Patent: Feb. 2, 2010

(54) METHOD FOR BRAKING A VEHICLE BY MEANS OF A FLUIDICALLY TRIGGERED VEHICLE BRAKE SYSTEM, AND VEHICLE BRAKE SYSTEM

(75) Inventors: Josef Knechtges, Mayen (DE); Frank Heller, Neuwied (DE); Jan Grundmann, Bassenheim (DE); Christian Chemnitz, Neuwied (DE)

(73) Assignee: Lucas Automotive GmbH (DE)

( * ) Notice: Subject to any disclaimer, the term of this patent is extended or adjusted under 35 U.S.C. 154(b) by 448 days.

(21) Appl. No.: 11/597,097

(22) PCT Filed: May 19, 2005

(86) PCT No.: PCT/EP2005/005455

§ 371 (c)(1), (2), (4) Date: Nov. 21, 2006

(87) PCT Pub. No.: WO2005/115816

PCT Pub. Date: Dec. 8, 2005

(65) Prior Publication Data

US 2008/0061624 A1 Mar. 13, 2008

(30) Foreign Application Priority Data

May 24, 2004 (DE) ...................... 10 2004 025 402

(51) Int. Cl.
*B60T 13/18* (2006.01)

(52) U.S. Cl. ........................................ 303/11; 303/191

(58) Field of Classification Search .................. 303/10, 303/11, 116.4, 190–192, 113.1–113.4
See application file for complete search history.

(56) References Cited

U.S. PATENT DOCUMENTS 6,019,436 A 2/2000 Siepker
6,249,737 B1 * 6/2001 Zipp .......................... 701/70
6,311,808 B1 * 11/2001 Halasy-Wimmer et al. . 188/72.6

(Continued)

FOREIGN PATENT DOCUMENTS

DE 196 32 863 A1 2/1998

(Continued)

*Primary Examiner*—Christopher P Schwartz
(74) *Attorney, Agent, or Firm*—MacMillan, Sobanski & Todd, LLC

(57) ABSTRACT

In a method for braking a vehicle by means of a fluidically triggerable vehicle brake system, wherein the vehicle brake system comprises a respective fluidically triggerable brake unit that is assigned to a vehicle wheel and is fluidically coupled to a brake force generator via at least one fluid circuit, wherein a pumping mechanism by means of which at least one of the brake units can be fed with brake fluid regardless of whether the brake force generator is activated, is provided in the at least one fluid circuit in order to convey brake fluid, and wherein control valves by means of which the brake force generator can be fluidically coupled to and disconnected from the brake units and the pumping mechanism are provided in the fluid circuit, it is provided that in order to comfortably create a parking brake condition, the following steps are carried out:

A) a fluid pressure is built up in the at least one fluid circuit via the brake force generator such that at least two of the brake units are fluidically triggered;
B) the brake force generator is disconnected from the brake units and the pumping mechanism by closing the control valves;
C) the pumping mechanism is activated (in two) and brake fluid is conveyed from one of the at least two brake units to the other one of the at least two brake units, respectively.

20 Claims, 2 Drawing Sheets

U.S. PATENT DOCUMENTS

| | | | | |
|---|---|---|---|---|
| 6,672,686 | B2 | 1/2004 | Lubischer | |
| 2004/0011610 | A1 | 1/2004 | Witzler et al. | |
| 2005/0001481 | A1* | 1/2005 | Kley et al. | 303/191 |
| 2005/0006947 | A1 | 1/2005 | Messner | |
| 2006/0220447 | A1* | 10/2006 | Giers | 303/11 |

FOREIGN PATENT DOCUMENTS

| | | | |
|---|---|---|---|
| DE | 101 10 658 | C1 | 7/2002 |
| DE | 10 2004 015 447 | A1 | 12/2004 |
| DE | 103 27 571 | A1 | 1/2005 |
| WO | WO 00/68053 | | 11/2000 |

* cited by examiner

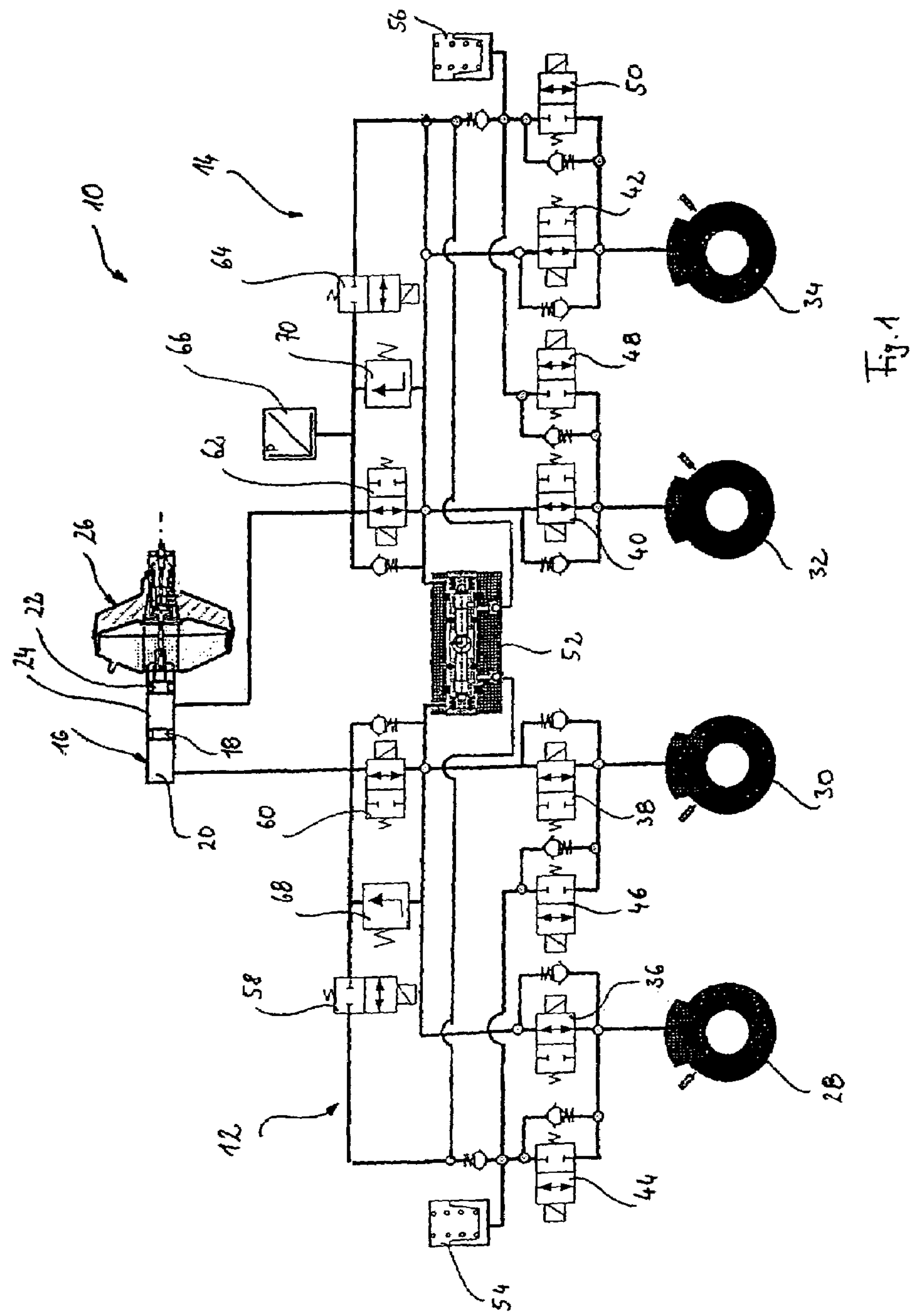

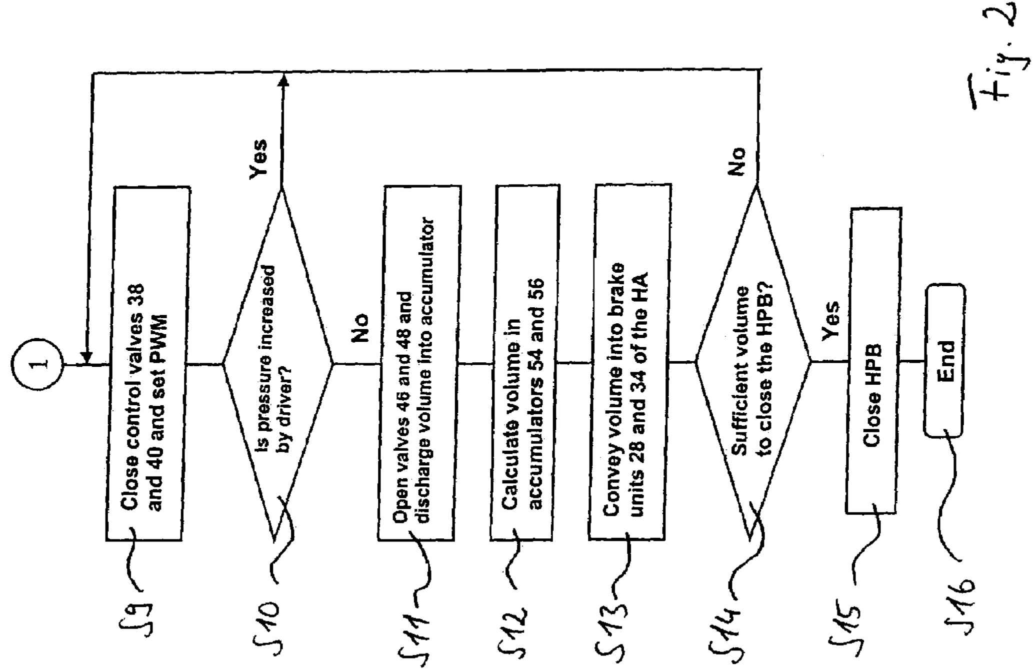
1
Close control valves 38 and 40 and set PWM
Is pressure increased by driver?
Yes
No
Open valves 46 and 48 and discharge volume into accumulator
Calculate volume in accumulators 54 and 56
Convey volume into brake units 28 and 34 of the HA
Sufficient volume to close the HPB?
No
Yes
Close HPB
End
S9
S10
S11
S12
S13
S14
S15
S16
Fig. 2

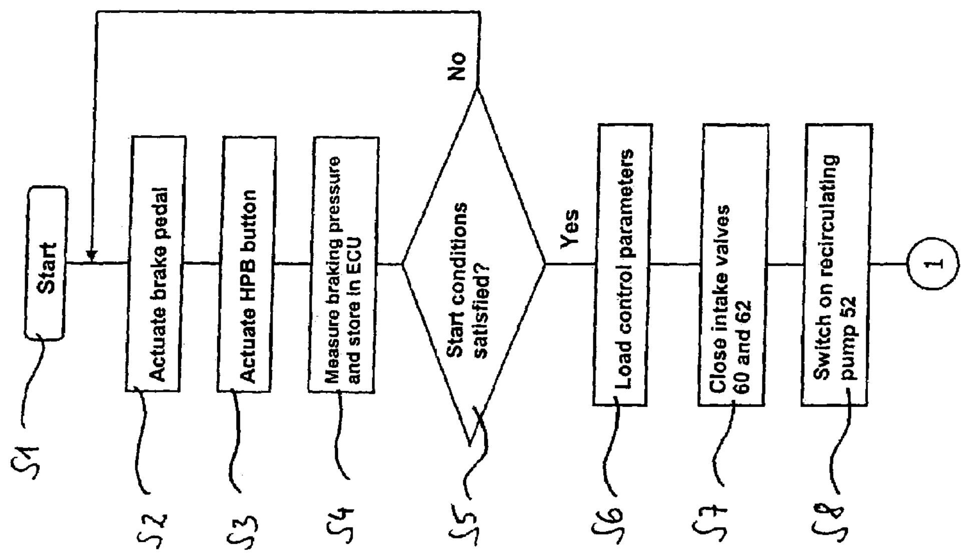
Start
Actuate brake pedal
Actuate HPB button
Measure braking pressure and store in ECU
Start conditions satisfied?
No
Yes
Load control parameters
Close intake valves 60 and 62
Switch on recirculating pump 52
1
S1
S2
S3
S4
S5
S6
S7
S8

METHOD FOR BRAKING A VEHICLE BY MEANS OF A FLUIDICALLY TRIGGERED VEHICLE BRAKE SYSTEM, AND VEHICLE BRAKE SYSTEM

CROSS-REFERENCE TO RELATED APPLICATIONS

This application is a national stage of International Application No. PCT/EP2005/005455 filed May 19, 2005, the disclosures of which are incorporated herein by reference, and which claimed priority to German Patent Application No. 10 2004 025 402.8 filed May 24, 2004, the disclosures of which are incorporated herein by reference.

BACKGROUND OF THE INVENTION

The present invention relates to a method for braking a vehicle by means of a fluidically triggerable vehicle brake system and to a corresponding vehicle brake system, wherein the vehicle brake system comprises a respective fluidically triggerable brake unit that is assigned to a vehicle wheel and is fluidically coupled to a brake force generator via at least one fluid circuit, wherein a pumping mechanism by means of which at least one of the brake units can be fed with brake fluid regardless of whether the brake force generator is activated, is provided in the at least one fluid circuit in order to convey brake fluid, and wherein control valves by means of which the brake force generator can be fluidically coupled to and disconnected from the brake units and the pumping mechanism are provided in the fluid circuit.

A vehicle brake system of this type is known from the prior art. Thus document DE 101 10 658 C1 and corresponding U.S. Pat. No. 6,672,686, which are hereby incorporated by referenced, disclose a hydraulic vehicle brake system in which two separate fluid circuits can be fed with brake fluid via a master brake cylinder. Two brake units are assigned to each fluid circuit, one brake unit of a front wheel and one brake unit of a rear wheel. To trigger the respective brake units control valves are provided. A pumping mechanism is also assigned to the two fluid circuits, via which the brake units can be triggered via the master brake cylinder independently of a pressure generation. It is consequently possible to achieve electronic control systems, such as an electronic stability program (ESP).

In order to be able to a achieve parking brake effect without significant additional technical complexity, in addition to the functionalities, described for the case of service braking in document DE 101 10 658 C1 and U.S. Pat. No. 6,672,686, of a vehicle brake system of this type, it is also known from the prior art to use the fluid pressure built up via the master brake cylinder and acting on the individual brake units to create a parking brake condition. For this purpose the brake fluid fed to the brake units of the vehicle wheels of the front axle for example is conveyed via the pumping mechanism from the brake units of the front axle to the brake units of the rear axle and then mechanically locks the brake units of the rear axle. In conventional vehicle brake systems this takes place in a condition in which a specific brake pressure is still built up via the master brake cylinder, for example in that the brake pedal is firmly depressed by the driver of the vehicle. However, this in turn means that during activation of the parking brake effect there is a direct fluidic connection between the master brake cylinder and the brake units. As a result vibrations and noise which occur during activation of the pumping mechanism to cause the parking brake condition are transmitted directly via the master brake cylinder, the adjoining brake booster and the brake pedal into the interior of the vehicle, and the driver and additional vehicle occupants can regard this as being disruptive. As a result of activation of the pumping mechanism brake fluid is also inevitably removed from the master brake cylinder, so the brake pedal yields under the pedal actuating force exerted by the driver of the vehicle, and this is again felt by the driver and could be regarded as unpleasant or at least unfamiliar.

BRIEF SUMMARY OF THE INVENTION

Compared with this, an aspect of this invention is to preferably provide a method and a vehicle brake system of the type mentioned at the outset in which activation of the parking brake function can be achieved using simple technical means and by avoiding disruptive influences in the interior of the vehicle.

This may be is achieved by a method of the type mentioned at the outset, wherein to create a parking brake condition, the following steps are carried out:

A) a fluid pressure is built up in the at least one fluid circuit via the brake force generator such that at least two of the brake units are fluidically triggered;

B) the brake force generator is disconnected from the brake units and the pumping mechanism by closing the control valves;

C) the pumping mechanism is activated and brake fluid is conveyed from one of the at least two brake units to the other one of the at least two brake units, respectively.

According to one aspect of the invention as already described at the outset in relation to the prior art, firstly a fluid pressure is built up in the at least one fluid circuit via the brake force generator, which pressure can be detected by means of a fluid sensor, so a braking effect is achieved at the at least two brake units, i.e. the brake units are applied. Consequently however the fluidic connection between the brake force generator and the remainder of the respective fluid circuit is broken, so activation of the pumping mechanism and resultant variations in pressure and vibrations in the fluid circuit generally cannot spread into the brake force generator. Only after closing the control valves is the pumping mechanism generally activated and as a consequence brake fluid is conveyed via the pumping mechanism from one brake unit of the fluid circuit to the respective other brake unit of the fluid circuit. The method according to the invention therefore may ensure that the effect of the pumping mechanism does not lead to disruptive noises in the interior of the vehicle or to unfamiliar yielding of the brake pedal.

Where within the framework of the description and claims of the present invention reference is made to a "brake force generator", this expression is to include both an arrangement in which a fluid pressure is generated in the at least one fluid circuit by a brake pedal, a brake booster and an adjoining master brake cylinder, as well as an arrangement in which a brake pedal actuation is detected and according to the requirement thereof a fluid pressure is generated in the at least one fluid circuit without directly using the pedal actuating force exerted on the brake pedal. The expression "brake force generator" should also include arrangements which only partially use the pedal actuating force exerted on the brake pedal, or use it only in certain (emergency) operating situations.

A development of the present invention provides that the pumping mechanism is triggered according to specific parameters, for example the vehicle inclination or/and the vehicle weight or/and the rotational speed of the wheels or/and the operating setting of a parking brake switch or/and the brake pedal actuation or/and the yaw rate or/and the transverse acceleration or/and the fluid pressure generated by the brake force generator. With respect to activation of the parking brake function it is thus possible for this to be prevented until the rotational speed output by each of the wheel sensors is at a specific limiting value or has even sunk to zero. It is also possible, using the vehicle inclination and the current vehicle speed, to determine a minimum fluid pressure at which accidental rolling away of the vehicle is ruled out.

As already indicated above, it may be necessary as a function of the current operating situation of the vehicle, for example when parking the vehicle on a very steep roadway, for the fluid pressure at the fluidically triggered brake units to achieve the parking brake effect to be considerably increased. In order to be able to provide sufficient hydraulic fluid, which is then conveyed via the pumping mechanism to the respectively triggered brake unit, a development of the invention provides that at least one fluid accumulator is assigned to each of the fluid circuits. The fluid accumulator can thus in each case be filled with brake fluid in conditions in which there is a sufficiently high fluid pressure, wherein this brake fluid can then be removed again as required. It is thus possible according to the invention for (optionally pressurised) brake fluid to be temporarily stored in the fluid accumulator and to be conveyed in step C) via the pumping mechanism to the respective other brake unit.

If the operating situation already discussed above is taken up again in which the vehicle is to be parked on a steep road, the situation may occur where the driver notices that the pedal actuating force he exerts on the brake pedal and the resultant fluid pressure in the at least one fluid circuit is not sufficient to safely park the vehicle. For example, the vehicle continues to roll at low speed despite the brake pedal being depressed. In this condition the driver will continue to depress the brake pedal in order to build up a higher fluid pressure in the at least one fluid circuit and ultimately increase the braking force. To take account of this operating situation, a development of the invention provides that when the fluid pressure is increased by the brake force generator during step B), the control valves are triggered in such a way that additional brake fluid from the brake force generator is stored in the fluid accumulator and the brake force generator is then disconnected from the brake units and the pumping mechanism by closing the control valves. As a result of this measure according to the invention the fluid pressure additionally generated in the brake force generator can therefore also be used to activate the parking brake function.

In this connection an advantageous development of the invention provides that the control valves are triggered according to a pulse method, for example a pulse-width modulation method. The opening or closing pulse width of the respective control valve may be varied within a period of time owing to a pulse-width modulation method of this type. Consequently it is possible to close the respective control vale with a holding force which corresponds to the fluid pressure at the start of activation of the parking brake function.

With respect to the pumping mechanism, it may be provided according to the invention that it is constructed as a recirculating pump in the fluid circuit, in particular as part of an electronic control system, for example an electronic stability system or/and an anti-lock braking system or/and a traction control system or/and an automatic speed control system. A pumping mechanism that exists in the braking system anyway may therefore be used to achieve the invention.

An advantageous embodiment of the invention provides that two fluid circuits are provided, wherein each fluid circuit is fluidically coupled to a brake unit assigned to a front wheel and to a brake unit assigned to a rear wheel respectively. It may also be provided that the vehicle wheels respectively assigned to a fluid circuit are arranged diagonally on the vehicle. In this connection it may also be provided according to the invention that in step C) brake fluid is conveyed from the front wheel to the rear wheel in each case.

The invention also relates to a vehicle brake system comprising a respective fluidically triggerable brake unit that is assigned to a vehicle wheel and is fluidically coupled to a brake force generator via at least one fluid circuit, wherein a pumping mechanism by means of which at least one of the brake units can be fed with brake fluid regardless of whether the brake force generator is activated, is provided in the at least one fluid circuit in order to convey brake fluid, and wherein control valves by means of which the brake force generator can be fluidically coupled to and disconnected from the brake units and the pumping mechanism are provided in the fluid circuit. In this vehicle brake system it is provided according to the invention that in order to create a parking brake condition, the brake force generator builds up a fluid pressure in the at least one fluid circuit in order to fluidically trigger at least two of the brake units, in that the control valves can also be controlled in such a way that the brake force generator is fluidically disconnected from the brake units and the pumping mechanism, and in that following fluidic decoupling of the brake force generator, the pumping mechanism conveys brake fluid from one of the at least two brake units to the other one of the at least two brake units respectively.

According to a development of the present invention the vehicle brake system comprises sensors for determining the vehicle inclination or/and the vehicle weight or/and the rotational speed of the wheels or/and an operating setting of a parking brake switch or/and the current excursion of a brake pedal or/and the transverse acceleration of the vehicle or/and the yaw rate or/and the fluid pressure generated by the brake force generator.

The vehicle brake system according to the invention is constructed in such a way that at least one fluid accumulator is assigned to each of the fluid circuits.

Other advantages of this invention will become apparent to those skilled in the art from the following detailed description of the preferred embodiments, when read in light of the accompanying drawings.

BRIEF DESCRIPTION OF THE DRAWINGS

FIG. 1 shows a schematic view of a vehicle brake system according to the invention and FIG. 2 shows a flow diagram to describe the method according to the invention.

DETAILED DESCRIPTION OF THE INVENTION

FIG. 1 shows an embodiment of a vehicle brake system according to the invention generally designated by reference numeral 10. The system comprises a first fluid circuit 12 and a second fluid circuit 14. The two fluid circuits 12 and 14 are fluidically coupled to a tandem master brake cylinder 16, wherein the fluid circuit 12 is fed with brake fluid by displacement of a secondary piston 18 from a secondary pressure chamber 20 and wherein the fluid circuit 14 is fed with brake fluid by displacement of a primary piston 22 from a primary pressure chamber 24. The main brake cylinder 16 is conventionally coupled to a vacuum brake booster 26 which can be actuated by a brake pedal (not shown).

The fluid circuits 12 and 14 are fluidically connected to brake units 28, 30, 32, 34, wherein the brake unit 28 is assigned to the left rear wheel, brake unit 30 to the right front wheel, brake unit 32 to the left front wheel and brake unit 34 to the right rear wheel of the vehicle. This assignment is what is referred to as a diagonal distribution. Other distributions could equally exist according to the invention, for example a front axle-rear axle distribution.

A respective intake valve 36, 38, 40, 42 is assigned to each brake unit 28, 30, 32, 34 and can be triggered separately via an electronic control unit (not shown). A respective exhaust valve 44, 46, 48, 50 is also assigned to each brake unit 28, 30, 32, 34 and can also be triggered separately via the electronic control unit. The two fluid circuits 12 and 14 are fluidically coupled to a pumping mechanism 52. An ABS or ESP functionality for example may be implemented via the intake valves 36, 38, 40, 42, the exhaust valves 44, 46, 48, 50 and the pumping mechanism 52. The intake valves 36, 38, 40, 42 are triggered with the aid of a PWM (pulse-width modulation) method. This results in high variability in triggering of these control valves.

Each of the fluid circuits 12 and 14 is also provided with a respective fluid accumulator 54 and 56 in which brake fluid can optionally be temporarily stored under pressure.

Finally a pair of control valves 58 and 60 and 62 and 64 is assigned to each of the fluid circuits 12 and 14. The control valves 58, 60, 62 and 64 may also be triggered separately via the electronic control unit using a PWM (pulse-width modulation) method, so high variability in triggering of these control valves may be achieved. The control valves 58, 60, 62 and 64 are arranged as follows in the two fluid circuits 12 and 14: control valves 58 and 60 are assigned to fluid circuit 12 and thus to brake units 28 and 30; control valves 62 and 64 are assigned to fluid circuit 14 and thus to brake units 32 and 34. This arrangement makes it possible to fluidically disconnect the individual brake units 28, 30, 32 and 34 from the master brake cylinder 16, so activation of the pumping mechanism 52 and resultant recirculation of the brake fluid into the individual fluid circuits 12 and 14 has no repercussion for the master brake cylinder 16.

FIG. 1 also shows that a pressure sensor 66 is arranged in the fluid circuit 14. FIG. 1 also shows a series of check valves and two pressure-limiting valves 68 and 70 of which one is assigned to fluid circuit 12 and the other to fluid circuit 14. These pressure-limiting valves 68 and 70 are used as overload protection.

In an alternative embodiment, instead of by way of the additional pressure-limiting valves 68 and 70, the overload function can be integrally achieved by mechanical or/and electronic measures at control valves that exist anyway.

The mode of operation of the vehicle brake system 10 during service braking, i.e. during deceleration of the vehicle during travel, is described in detail in DE 101 10 658 C1 already mentioned at the outset, and will therefore not be described in detail again here. The content of DE 101 10 658 C1 is also to be incorporated into this disclosure by reference thereto.

The mode of operation of the vehicle brake system according to the invention and the course of the method according to the invention on activation of the parking brake function will be described hereinafter with reference to FIG. 2.

Firstly the system is started in step S1, for example by the driver actuating the brake pedal according to step S2 and pressing a parking brake button in the interior of the vehicle according to step S3. On actuation of the brake pedal a fluid pressure is built up in the fluid circuits 12 and 14 via the brake force generator that comprises the master brake cylinder 16 and brake booster 26. This fluid pressure is detected by means of pressure sensors 66 in the fluid circuit 14 and by means of a corresponding pressure sensor (not shown) in fluid circuit 12, as indicated in step S4, and stored in an electronic control unit (not shown). A check is then made in step S5 as to whether all start conditions are satisfied, for example whether the brake pedal has been actuated by the driver, whether the car is still stationary or/and whether the gear lever of a vehicle equipped with an automatic transmission is in the "Park" position.

If the start conditions are satisfied control parameters, such as the current inclination of the vehicle, the total weight of the vehicle, the rotational speed at the individual wheels, the current excursion of the brake pedal, the transverse acceleration of the vehicle, the yaw rate or the like, are consequently loaded in step S6 from the electronic control unit (not shown in FIG. 1. These control parameters are detected by additional sensors (not shown in FIG. 1). On the basis of this information parameters for controlling the control valves 60 and 62 are calculated, for example the pulse width of a pulse-width modulation method with which the control valves 60 and 62 are triggered. In step S7 the control valves 60 and 62 are closed using the calculated pulse width according to the pulse-width modulation method. The control valves 58 and 64 are also closed.

The pumping mechanism 52 is then activated according to step S8. With activation of the pumping mechanism 52 the intake valves 38 and 40 of the brake units 30 and 32 assigned to the front wheels are closed in step S9 with the aid of a pulse-width modulation method with a holding force which corresponds to the fluid pressure at the start of activation of the parking brake function.

In step S10 monitoring is carried out as to whether the driver increases the fluid pressure in the fluid circuits 12 and 14 further by stronger or renewed depression of the brake pedal. Such an increase in pressure would for example take place if the driver wished to park the vehicle on an inclined road, depresses the brake pedal to a certain extent for this purpose and notices that despite the already depressed brake pedal the vehicle still does not quite stop. In such a situation the driver will depress the brake pedal more forcefully, so the vehicle definitely stops on the inclined road.

If it is detected in step S10 that the fluid pressure is being increased further by the driver, an additional quantity of brake fluid is conveyed from the master brake cylinder 16 into the brake units 28, 30, 32, and 34 and then into the fluid accumulators 54 and 56, wherein the pulse width of the intake valves 38 and 40 of the brake units 30 and 32 assigned to the front wheels is matched to the current fluid pressure.

If no further increase in pressure is detected in step S10, the system proceeds to the next step, S11. In this step the exhaust valves 46 and 48 of the brake units 30 and 32 assigned to the front wheels are opened and brake fluid discharged into the fluid accumulators 54 and 64.

In step S12 the electronic control unit calculates, by taking into account the remaining control parameters loaded in step S6, whether the volume of brake fluid stored in the fluid accumulators 54 and 56 is sufficient to build up a sufficiently large fluid pressure in the brake units 28 and 34 so a reliable parking brake effect is achieved.

The intake valves 36 and 42 of the brake units 28 and 34 assigned to the rear wheels are consequently opened and the intake valves 36 and 42 of the brake units 30 and 32 assigned to the front wheels closed. The exhaust valves 44 and 50 of the brake units 28 and 34 assigned to the rear wheels are also closed and the exhaust valves 46 and 48 of the brake units 30 and 32 assigned to the front wheels are opened, to discharge brake fluid into the fluid accumulators 54 and 56. With this position of the intake valves 36, 38, 40, 42 and of the exhaust valves 44, 46, 48, 50, and with a simultaneously closed position of the control valves 58, 60, 62, 64, in step S13 the pumping mechanism 52 conveys brake fluid from the brake units 30 and 32 assigned to the front wheels to the brake units 28 and 34 assigned to the rear wheels, so a fluid pressure is built up in the brake units 28 and 34 which leads to adequate application of the brake units 28 and 34.

In step S14 the system checks whether the brake fluid diverted from the brake units 30 and 32 of the front axle into the brake units 28 and 34 of the rear axle is sufficient to achieve a reliable parking brake effect. If it transpires that this is not the case, the system jumps to step S8 again and additional brake fluid is conveyed from the master brake cylinder 16 into the fluid accumulators 54 and 56. If, by contrast, step S14 shows that the volume of brake fluid stored in the fluid accumulators 54 and 56 is sufficient to activate a reliable parking brake function, the brake units 28 and 34 are blocked in step S15 in the conventional manner, for example by respective blocking of a mechanical parking brake arrangement. The parking brake function is accordingly activated, so the vehicle is safely parked in step S16.

To deactivate the parking brake function the brake pedal merely has to be strongly depressed again or an algorithm analogous to the above-described method for activating the parking brake function can be started. In both cases the mechanical parking brake arrangement of the brake units 28 and 34 is cancelled. As a result the vehicle brake system is again in a condition in which normal service braking operations can be carried out.

The invention described above makes it possible to use a fluidically actuable vehicle brake system to activate a parking brake function, wherein activation of the pumping mechanism required for this does not lead to disruptive noises in the interior of the vehicle and cannot be sensed by the driver by way of unfamiliar yielding of the brake pedal either.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. Method for braking a vehicle by means of a fluidically triggerable vehicle brake system, wherein the vehicle brake system comprises first, second, third, and fourth brake units assigned to a vehicle wheel and are fluidically coupled to a brake force generator via at least one fluid circuit, wherein a pumping mechanism by means of which at least one of the first, second, third, and fourth brake units can be fed with brake fluid regardless of whether the brake force generator is activated, is provided in the at least one fluid circuit in order to convey brake fluid, and wherein control valves by means of which the brake force generator can be fluidically coupled to and disconnected from the first, second, third, and fourth brake units and the pumping mechanism are provided in the fluid circuit, wherein in order to create a parking brake condition, the following steps are carried out:

A) a fluid pressure is built up in the at least one fluid circuit via the brake force generator such that at least the first and second brake units are fluidically triggered;

B) the brake force generator is disconnected from the first, second, third, and fourth brake units and the pumping mechanism by closing the control valves;

C) the pumping mechanism is activated and brake fluid is conveyed from the first brake unit to the third brake unit, and wherein brake fluid is conveyed from the second brake unit to the fourth brake unit.

2. Method according to claim 1, wherein at least one fluid accumulator is assigned to each of the at least one fluid circuits, respectively.

3. Method according to claim 2, wherein brake fluid is temporarily stored in the at least one fluid accumulator and in step C) is conveyed by the pumping mechanism to the third and fourth brake units.

4. Method according to claim 2, wherein when the fluid pressure is increased by the brake force generator during step B), the control valves are triggered in such a way that additional brake fluid from the brake force generator is stored in the fluid accumulator and the brake force generator is then disconnected from the first, second, third, and fourth brake units and the pumping mechanism by closing the control valves.

5. Method according to claim 1, wherein the pumping mechanism is triggered according to specific parameters including at least one of the vehicle inclination, the vehicle weight, the rotational speed of the wheels, the operating setting of a parking brake switch, the brake pedal actuation, the yaw rate, the transverse acceleration, and the fluid pressure generated by the brake force generator.

6. Method according to claim 1, wherein the control valves are triggered according to a pulse-width modulation method.

7. Method according to claim 1, wherein the pumping mechanism is constructed as a recirculating pump in the fluid circuit.

8. Method according to claim 7, wherein the recirculating pump is part of an electronic control system defined by at least one of an electronic stability system, an anti-lock braking system, a traction control system, and an automatic speed control system.

9. Method according to claim 1, wherein vehicle wheels respectively assigned to a fluid circuit are arranged diagonally on the vehicle.

10. Method according to claim 1, wherein in step C) brake fluid is conveyed from a front wheel to a rear wheel in each case.

11. Method according to claim 1, wherein first and second fluid circuits are provided, wherein the first fluid circuit is fluidically coupled to the first and third brake units, and wherein the second fluid circuit is fluidically coupled to the second and fourth brake units, and wherein the first and second brake units are assigned to front wheels, and wherein the third and fourth brake units are assigned to rear wheels.

12. Vehicle brake system comprising fluidically triggerable first, second, third, and fourth brake units each assigned to a respective vehicle wheel and is fluidically coupled to a brake force generator via at least one fluid circuit, wherein a pumping mechanism by means of which at least one of the first, second, third, and fourth brake units can be fed with brake fluid regardless of whether the brake force generator is activated, is provided in the at least one fluid circuit in order to convey brake fluid, and wherein control valves by means of which the brake force generator can be fluidically coupled to and disconnected from the first, second, third, and fourth brake units and the pumping mechanism are provided in the fluid circuit, wherein in order to create a parking brake condition, the brake force generator builds up a fluid pressure in the at least one fluid circuit in order to fluidically trigger at least the first and second brake units, in that the control valves are adapted to be triggered in such a way that the brake force generator is fluidically disconnected from the first, second, third, and fourth brake units and the pumping mechanism, and in that following fluidic decoupling of the brake force generator, the pumping mechanism conveys brake fluid from the first brake unit to the third brake unit, and wherein brake fluid is conveyed from the second brake unit to the fourth brake unit.

13. Vehicle brake system according to claim 12, including a sensor for determining one of the vehicle inclination, the vehicle weight, the rotational speed of the wheels, an operating setting of a parking brake switch, the current excursion of a brake pedal, the transverse acceleration, the yaw rate of the vehicle, and the fluid pressure generated by the brake force generator.

14. Vehicle brake system according to claim 12, wherein at least one fluid accumulator is assigned to each of the at least one fluid circuits, respectively.

15. Vehicle brake system according to claim 12, wherein the control valves can be triggered according to a pulse-width modulation method.

16. Vehicle brake system according to claim 12, wherein first and second fluid circuits are provided, wherein the first fluid circuit is fluidically coupled to the first and third brake units, and wherein the second fluid circuit is fluidically coupled to the second and fourth brake units, and wherein the first and second brake units are assigned to front wheels, and wherein the third and fourth brake units are assigned to rear wheels.

17. Vehicle brake system according to claim 12, wherein the vehicle wheels respectively assigned to a fluid circuit are arranged diagonally on the vehicle.

18. Vehicle brake system according to claim 12, wherein each of the first, second, third, and fourth brake units can be fed with brake fluid via respective intake valves, wherein the intake valves can be triggered according to a pulse-width modulation method.

19. Vehicle brake system according to claim 12, wherein the pumping mechanism is constructed as a recirculating pump in the fluid circuit.

20. Vehicle brake system according to claim 19 including an electronic control system defined by at least one of an electronic stability system, an anti-lock braking system, a traction control system, and an automatic speed control system, and wherein the recirculating pump is part of the electronic control system.

* * * * *